C. A. EWICK.
Wheel-Cultivator.
No. 70,328. Patented Oct. 29, 1867.
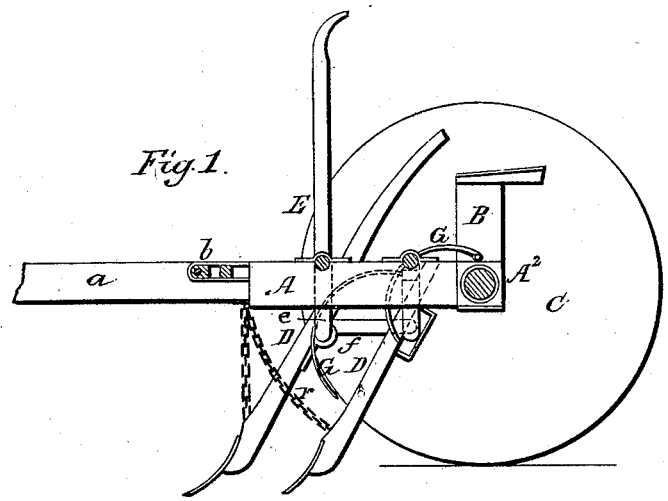
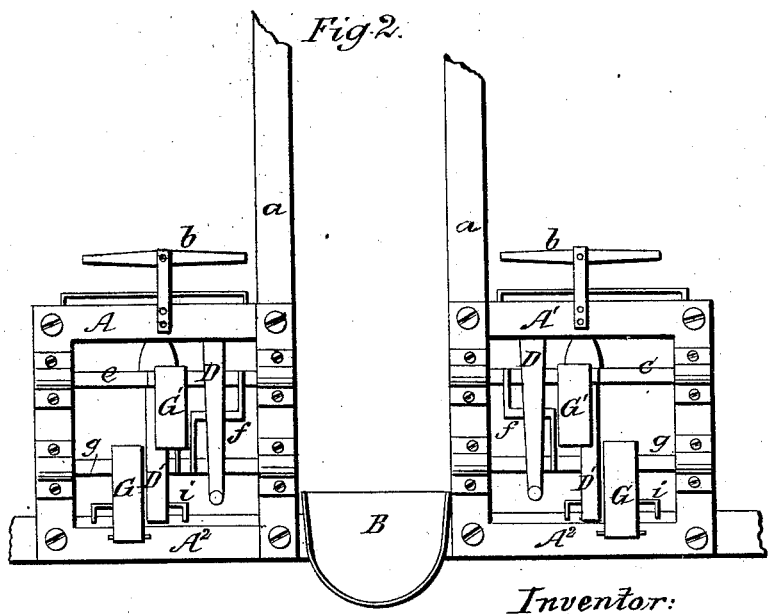
Inventor:
C. A. Ewick
Alexander Mason
Attys.

United States Patent Office.

C. A. EWICK, OF RUSHVILLE, INDIANA.

Letters Patent No. 70,328, dated October 29, 1867.

---

IMPROVEMENT IN CULTIVATORS.

---

The Schedule referred to in these Letters Patent and making part of the same.

---

TO ALL WHOM IT MAY CONCERN:

Be it known that I, C. A. EWICK, of Rushville, in the county of Rush, and in the State of Indiana, have invented certain new and useful Improvements in Cultivators; and do hereby declare that the following is a full, clear, and exact description thereof, reference being had to the accompanying drawings, and to the letters of reference marked thereon, making a part of this specification.

Figure 1 represents a side elevation with the outer wheel taken off.

Figure 2, a plan view of the cultivator.

In the annexed drawings A A¹ represent two small frames, made in a square or other suitable form, the rear pieces of which are prolonged into suitable axles A² for attaching wheels C. The two axle-bars A² are connected together by a bent metal plate, which supports the seat B. The two inner bars of the frames are prolonged and form suitable thills $a\ a$, between which the horse may be attached. $b\ b$ represent single-trees in front of each frame A A¹, so that either one, two, or three horses may be worked in this machine. Extending from side to side, and secured upon the frames A A¹, are crank-bars $e$ and $g$, which extend a short distance below the frames, and are connected to the rear of the shovel-beams D and D' by suitable keepers $t'$. The forward cranks $e$ are each provided with an extended lever, E, so that the driver can adjust the shovels the depth in the ground that he desires. G G' represent curved springs, which are hinged to the frame A and to the side of the crank $g$ respectively, and are intended to keep the shovel-beams in position.

It will be seen that the inside beams D D are extended so as to be within reach of the driver, who can give them a lateral motion on their cranks for dodging the rows of corn whenever they are crooked. By raising the springs between the shovels, and moving the outside shovels inward, and the inside shovels outward, you form a single-shovel or a subsoil-plough. The beams are hinged to metal keepers $i\ i$ on the frame, while both beams on each side are held by chains $r\ r$ secured in a keeper in the front of the frame. This invention can be used for a single plough, a double-shovel, or a subsoil-plough, as desired.

Having thus fully described my invention, what I claim as new, and desire to secure by Letters Patent, is—

1. The arrangement of the frames A A¹, connected together as specified, and provided with the cranks $e\ e\ g\ g$, in the manner and for the purposes set forth.

2. The shovel-beams D D' D D', connected to the cranks $e$ and $g$, and secured in position by the springs G G', and chains $r\ r$ to the frame A, as specified.

In testimony that I claim the foregoing I have hereunto set my hand this 5th day of August, 1867.

C. A. EWICK.

Witnesses:
JOSEPH H. LAKIN,
BENJAMIN R. MITCHELL.